2,790,785
RUBBER STABILIZED WITH HYDROCARBON TIN MERCAPTO ALCOHOL ESTERS

Hugh E. Ramsden, Metuchen, N. J., Elliott L. Weinberg, Long Island City, N. Y., and Louis A. Tomka, Westfield, N. J., assignors to Metal & Thermit Corporation, New York, N. Y., a corporation of New Jersey No Drawing. Application January 29, 1954, Serial No. 407,152

20 Claims. (Cl. 260—45.75)

The present invention relates to the stabilization of elastomers against degradation brought about by aging, especially of rubber compounds of the class consisting of natural rubber and rubbery synthetic polymers. Such properties of the elastomers as elongation, tensile strength, modulus, tackiness, surface crackings, etc., are adversely affected by aging in the absence of a stabilizer normally terms rubber antioxidants.

It has been found that hydrocarbontin mercapto-alcohol esters, or to state it in another fashion, organotin derivatives of mercapto-alcohol esters having the formula $$R_nSn(SR'OX)_{4-n}$$

where R is an alkyl, aryl, aralkyl group and R' is an alkylene or arylene group, X is a residue of an oxygen containing acid less an hydroxyl group, and where n is an integer in the order of 1, 2 or 3, are effective anti-oxidants for natural and synthetic rubbers. In these compounds, all valences of Sn not satisfied by R groups are joined to S atoms.

Compounds coming under the above formula may be prepared in any suitable manner. For example, they may be prepared in high yield and purity by the reaction of an hydrocarbontin oxide, hydroxide or a stannoic acid with a mercapto-alcohol ester. Another process for preparing these derivatives, by employing a hydrocarbontin halide as a starting material, is to react it with a mercapto-alcohol ester in the presence of basic acid acceptors, such as alkali metal and alkaline-earth metal oxides, hydroxides, bicarbonates, carbonates and tertiary amines.

Among the hydrocarbon derivatives that may be employed to constitute R in the above formula, are included the following: methyl, ethyl, butyl, propyl, lauryl, tolyl, phenyl, phenylethyl, benzyl. R' may be derived from any mercapto alcohol capable of being esterified and wherein the mercapto group is not inactivated by molecular configuration. Thus R' may be derived from beta mercapto ethanol, 3-mercaptopropanol-1; 2-mermaptopropanol-1; 1-mercaptopropanol-2; 2(3 or 4) mercapto-n-butanol-1; o-(m or p) mercaptobenzyl alcohol. X may be derived from any organic acid, anhydride, or inorganic acid capable of esterifying by direct esterification or alcoholysis; thus X may be derived from acetic acid, acetic anhydride, 2-ethyl hexanoic acid, lauric acid, stearic acid, phthalic acid or anhydride succinic acid or anhydride, adipic acid, sebacic acid, sulfuric acid, phosphoric acid or boric acid. Hydrocarbontin mercapto-alcohol esters are extremely effective as rubber-anti-oxidants as demonstrated by their stabilizing ability at exceptionally low concentrations, and are effective at .05 to 5% based on the weight of the rubber with a preferred range of .1 to 1% hydrocarbontin mercapto-alcohol ester based on the weight of the rubber.

These hydrocarbontin mercapto-alcohol esters, when used as rubber anti-oxidants, are non-discoloring, and thereby permit the manufacture of white stocks.

The hydrocarbontin mercapto-alcohol esters herein described can effectively be used as anti-oxidants with elastomers and more specifically with rubbery materials of the class consisting of (a) natural rubber, (b) rubber-like copolymers of 1, 3 butadiene and styrene (GR-S type), (c) rubber-like copolymers of 1,3 butadiene and acrylonitrile (nitrile type) and (d) rubber-like homopolymers of chloroprene (Neoprene type).

The hydrocarbontin mercapto-alcohol esters may be milled into the rubbery materials defined above, without other additions, for the purpose of preventing degradation during storage. More commonly, they will be incorporated with other materials during compounding.

Any suitable compounding formulation may be employed. A specific example of a natural rubber composition, in which the hydrocarbontin mercapto-alcohol esters are effective as an anti-oxidant, is as follows:

| | Pts. by Wt. |
|---|---|
| Thin, pale crepe | 100.0 |
| Zinc oxide (lead free) | 5.0 |
| Stearic acid | 1.0 |
| Titanium dioxide (anatase) | 10.0 |
| Insoluble sulfur | 3.0 |
| Benzothiazyl disulfide | 1.0 |
| Tetramethylthiuram disulfide | 0.1 |

To this composition may be added any one of the hydrocarbontin mercapto-alcohol esters coming under the general formula set forth above, in proportion of 0.05% to 5% by weight, based on the weight of the rubber ingredient of said composition and preferably in the approximate 0.1% to 1% level. This compounded rubber composition containing the anti-oxidant was worked and blended by conventional techniques and vulcanized at 275° F. for twenty minutes in an hydraulic press.

The effectiveness of the hydrocarbontin mercapto-alcohol esters herein described as anti-oxidants, is indicated by the following test results carried out with the specific rubber composition described above containing anti-oxidant in the amounts shown below.

Example 1 _____ No anti-oxidant.
Example 2 _____ .10 pt. of dibutyltin S,S' bis (mercapto-ethyl laurate).
Example 3 _____ 1 pt. of dibutyltin S,S' bis (mercapto-ethyl laurate).
Example 4 _____ 1 pt. Commercial Anti-oxidant A.

The test methods employed to determine the anti-oxidant properties consisted of (1) outdoor exposure and (2) the oxygen bomb test—ASTM Procedure D-572-48. The outdoor exposure test samples were examined for tackiness, surface checking and discoloration. The oxygen bomb test samples were examined for changes in tensile strength, elongation and modulus with the standard equipment.

The results of the tests on the examples described above were as follows:

*Outdoor exposure—60 days*

| Sample | Color | Tackiness | Surface Checking |
|---|---|---|---|
| Ex. 1 | No discoloration | Pronounced | Pronounced. |
| Ex. 2 | do | None | Very slight. |
| Ex. 3 | do | do | Do. |
| Ex. 4 | Discolored | Slight | Pronounced. |

*Oxygen bomb test—4 days @ 70° C.*

| Sample | Modulus (p. s. i) 200% Elongation | | (p. s. i) Tensile Strength | | Percent Elongation | |
|---|---|---|---|---|---|---|
| | Orig. | Aged | Orig. | Aged | Orig. | Aged |
| Ex. 1 | 270 | 270 | 2,980 | 1,300 | 600 | 500 |
| Ex. 2 | 285 | 310 | 2,950 | 2,300 | 620 | 570 |
| Ex. 3 | 265 | 305 | 3,000 | 2,100 | 645 | 520 |
| Ex. 4 | 250 | 315 | 3,210 | 2,400 | 645 | 525 |

Similar test on GR–S rubber (1,3 butadienestyrene) indicate that the stabilization of synthetic rubber with organotin derivatives of the type described, is just as pronounced as it is in the case of natural rubber.

Although the examples show the stabilizer used with natural rubber crepe and with coagulated GR–S (1,3 butadiene and styrene), incorporation of the stabilizer into latices is possible. The latices would then be processed in the usual manner.

The rubber composition to be stabilized may contain pigments to impart any desired color or decorative effect to the final product. The stabilizer will cause the rubber composition to maintain its color whether it is black, white or any other color.

While the invention has been described with reference to various examples and embodiments, it will be apparent to those skilled in the art that various modifications may be made, and equivalents substituted therefor, without departing from the principles and true nature of the invention.

We claim:

1. A rubber composition comprising as a basic ingredient, a rubbery polymer selected from the group consisting of natural rubber, copolymers of 1,3 butadiene and styrene and copolymers of 1,3 butadiene and acrylonitrile and containing a stabilizing amount of a hydrocarbon tin derivative of a mercaptoalcohol ester having the formula: $R_nSn(SR'OX)_{4-n}$, wherein $n$ is an integer from 1 to 3, R is a hydrocarbon radical selected from the group consisting of alkyl, aryl and aralkyl radicals, R' is a divalent radical selected from the group consisting of alkylene and arylene radicals, X is the residue of an acid after removal of one OH, said acid being selected from the group consisting of carboxy acids, sulfuric acid, phosphoric acid and boric acid and wherein tin is bonded to the divalent sulfur of the (SR'OX) group.

2. A composition according to claim 1, wherein the stabilizing agent is present in the amount of about 0.05% to 5% by weight, based on the rubber ingredients.

3. A composition according to claim 1, wherein said composition is cured.

4. A composition according to claim 1, wherein said composition contains pigments.

5. A composition according to claim 1, wherein the stabilizing agent is present in the amount of about .1% to 1% by weight, based on the rubber ingredients.

6. A composition according to claim 5, wherein said composition is cured.

7. A rubber composition comprising as a basic ingredient, a copolymer of 1,3 butadiene and styrene and containing a stabilizing amount of a hydrocarbon tin derivative of a mercaptoalcohol ester having the formula: $R_nSn(SR'OX)_{4-n}$, wherein $n$ is an integer from 1 to 3, R is a hydrocarbon alkyl radical, R' is an alkylene radical and X is the residue of a carboxy acid after the removal of the one OH, and wherein tin is bonded to the divalent sulfur of the (—SR'OX) group.

8. A composition according to claim 7, wherein $n$ is 2.

9. A composition according to claim 8, wherein the stabilizer is present in the amount of about 0.05% to 5% by weight, based on the rubber ingredients.

10. A composition according to claim 9, wherein the composition is cured.

11. A composition according to claim 8, wherein the stabilizer is present in the amount of about .1% to 1% by weight based on the rubber ingredients.

12. A composition according to claim 11, wherein the composition is cured.

13. A composition according to claim 8, wherein the organotin stabilizer is dibutyltin S,S' bis (mercaptoethyl laurate).

14. A composition according to claim 13, wherein the stabilizer is present in an amount of about 0.05% to 5% by weight, based on the rubber ingredients.

15. A composition according to claim 14, wherein the composition is cured.

16. A composition according to claim 13, wherein the stabilizer is present in an amount of about .1% to 1% by weight, based on the rubber ingredients.

17. A composition according to claim 16, wherein the composition is cured.

18. A method which comprises curing the composition of claim 1.

19. The method of claim 18, wherein the rubbery polymer is a copolymer of 1,3 butadiene and styrene and the stabilizer is dibutyltin S,S' bis (mercaptoethyl laurate).

20. The method of claim 19, wherein the stabilizer is present in the amount of about .1% to 1% by weight, based on the rubber ingredients.

References Cited in the file of this patent

UNITED STATES PATENTS

| | | |
|---|---|---|
| 2,641,596 | Leistner et al. | June 9, 1953 |
| 2,648,650 | Weinberg et al. | Aug. 11, 1953 |